(12) United States Patent
Wang et al.

(10) Patent No.: US 11,789,895 B2
(45) Date of Patent: *Oct. 17, 2023

(54) ON-CHIP HETEROGENEOUS AI PROCESSOR WITH DISTRIBUTED TASKS QUEUES ALLOWING FOR PARALLEL TASK EXECUTION

(71) Applicant: SHANGHAI DENGLIN TECHNOLOGIES CO., LTD., Shanghai (CN)

(72) Inventors: Ping Wang, Shanghai (CN); Jianwen Li, Shanghai (CN)

(73) Assignee: SHANGHAI DENGLIN TECHNOLOGIES CO., LTD., Shanghai (CN)

(*) Notice: Subject to any disclaimer, the term of this patent is extended or adjusted under 35 U.S.C. 154(b) by 246 days.

This patent is subject to a terminal disclaimer.

(21) Appl. No.: 16/812,817

(22) Filed: Mar. 9, 2020

(65) Prior Publication Data

US 2021/0073169 A1 Mar. 11, 2021

(30) Foreign Application Priority Data

Sep. 9, 2019 (CN) .......................... 201910846915.7

(51) Int. Cl.
*G06F 9/48* (2006.01)
*G06F 15/78* (2006.01)
*G06N 20/00* (2019.01)

(52) U.S. Cl.
CPC .......... *G06F 15/781* (2013.01); *G06F 9/4881* (2013.01); *G06F 15/7807* (2013.01); *G06N 20/00* (2019.01)

(58) Field of Classification Search
CPC ... G06F 9/4881; G06F 15/7807; G06F 15/781
See application file for complete search history.

(56) References Cited

U.S. PATENT DOCUMENTS 9,841,998 B2 * 12/2017 Balakrishnan ........ G06F 9/5027
2015/0277993 A1 * 10/2015 Gu .......................... G06F 9/455
718/102

(Continued)

*Primary Examiner* — Jacob Petranek
(74) *Attorney, Agent, or Firm* — Zhong Law, LLC

(57) ABSTRACT

Embodiments described herein provide an on-chip heterogeneous Artificial Intelligence (AI) processor comprising at least two different architectural types of computation units, wherein each of the computation units is associated with a respective task queue configured to store computation subtasks to be executed by the computation unit. The AI processor also comprises a controller configured to partition a received computation graph associated with a neural network into a plurality of computation subtasks according to a preset scheduling strategy and distribute the computation subtasks to the task queues of the computation units. The AI processor further comprises a storage unit configured to store data required by the computation units to execute their respective computation subtasks and an access interface configured to access an off-chip memory. Different application tasks are processed by managing and scheduling the different architectural types of computation units in an on-chip heterogeneous manner.

10 Claims, 4 Drawing Sheets

(56) References Cited

U.S. PATENT DOCUMENTS

| | | | |
|---|---|---|---|
| 2018/0189105 A1* | 7/2018 | Sanghvi | G06F 9/4812 |
| 2020/0012521 A1* | 1/2020 | Wu | G06N 3/0454 |
| 2020/0043123 A1* | 2/2020 | Dash | G06T 1/20 |
| 2020/0249998 A1* | 8/2020 | Che | G06N 3/063 |
| 2021/0064425 A1* | 3/2021 | Li | G06F 9/4881 |

* cited by examiner

ON-CHIP HETEROGENEOUS AI PROCESSOR WITH DISTRIBUTED TASKS QUEUES ALLOWING FOR PARALLEL TASK EXECUTION

TECHNICAL FIELD

The present invention relates to heterogeneous computation and processor architectures, and in particular to an on-chip heterogeneous processor for artificial intelligence processing.

BACKGROUND

Artificial Intelligence (AI) technologies are in rapid development, and have infiltrated various fields such as visual perception, voice recognition, assistant driving, smart homes, traffic scheduling, etc. Most AI algorithms involve learning and computation based on a neural network, for example, a Convolutional Neural Network (CNN), a Recurrent Neural Network (RNN), a Deep Neural Network (DNN), etc. These AI algorithms generally require a high parallel computation capability to process massive amounts of data and Central Processing Units (CPUs) that utilize serial instruction execution have been deemed inefficient for the execution of such AI algorithms. Thus, a heterogeneous computation architecture referred to as "CPU+Acceleration Chip" has been proposed, in which an AI chip specialized in performing large amounts of computation tasks in AI applications is used, while other non-computation tasks are still handled by a CPU. In this heterogeneous computation architecture, the CPU is used as a host processor for processing irregular data structures, unpredictable access modes, recursive algorithms, branch-intensive codes, single-threaded programs, etc., and the AI chip is used as a co-processor for performing computation tasks, such as multiplication, addition and division of matrices or vectors related to the AI algorithms. The CPU in this heterogeneous architecture can create a bottleneck that constrains the performance of the computation acceleration chip. As a result, system performance has to be compensated by a multi-core CPU, leading to unnecessary power consumption and cost. Moreover, different modules in the heterogeneous architecture are driven by different software and coordination efficiency among the modules is low.

Dedicated AI application-oriented chips can also be called AI chips, AI processors, co-processors, AI accelerators, etc. At present, main AI chip architectures can be generally classified into GPU, FPGA and ASIC. Graphics Processing Units (GPUs) are first used in AI computation due to its good matrix computation capability and advantage in parallel computation. However, due to large chip size and high power consumption, it is difficult to effectively improve the performance of GPUs. Field-Programmable Gate Arrays (FPGAs) are hardware-programmable, but have poorer performance than GPUs. Application Specific Integrated Circuits (ASICs) can be customized for particular application requirements. They are smaller in size and lower in power consumption, but have no programmability and poor adaptability and scalability. With the popularization of AI algorithms in varied application fields, there is an urgent need for a scalable and efficient AI processor that can adapt to specific application requirements.

SUMMARY

Hence, an objective of the embodiments described herein is to provide a novel on-chip heterogeneous AI processor, which processes different AI application tasks by managing and scheduling different architectural types of computation units in an on-chip heterogeneous manner and improves the efficiency of executing computation tasks while flexibly adapting to different application scenarios.

This objective is achieved by one or more of the following technical solutions.

In accordance with a first aspect of the embodiments, an on-chip heterogeneous AI processor is provided. The on-chip heterogeneous AI processor includes at least two different architectural types of computation units, wherein each computation unit is associated with a task queue configured to store computation subtasks to be executed by the computation unit. The AI processor also includes a controller, a storage unit, and an access interface. The controller is configured to partition a received computation graph associated with a neural network into a plurality of computation subtasks and distribute the plurality of computation subtasks to the respective task queues of the computation units. The storage unit is configured to store data required by the computation units to execute the computation subtasks, and the access interface is configured to access an off-chip memory.

In some embodiments, the architectural type of the computation unit may be one of the following: Application Specific Integrated Circuit (ASIC), General-Purpose Graphics Processing Unit (GPGPU), Field-Programmable Gate Array (FPGA), or Digital Signal Processor (DSP).

In some embodiments, one of the at least two different architectural types of computation units is a customized computation unit for a particular AI algorithm or operation, and the other is a programmable computation unit.

In some embodiments, the at least two different architectural types of computation units may include computation units of an Application Specific Integrated Circuit (ASIC) architecture and computation units of a General-Purpose Graphics Processing Unit (GPGPU) architecture.

In some embodiments, the storage unit may include a cache memory and a scratch-pad memory.

In some embodiments, the scratch-pad memory can be shared by the computation units.

In some embodiments, an independent parallel mode, a cooperative parallel mode and an interactive cooperation mode can be supported among the computation units, wherein in the independent parallel mode, at least two of the computation subtasks of the computation units are executed independently and in parallel with each other; in the cooperative parallel mode, at least two of the computation subtasks of the computation units are executed cooperatively in a pipelined manner; and, in the interactive cooperation mode, a first one of the computation units, during the execution of a computation subtask, waits for or depends on the results generated by a second one of the computation units executing a computation subtask distributed to the second computation unit.

In some embodiments, the controller can distribute the plurality of computation subtasks to the computation units according to the capabilities of the computation units.

In some embodiments, the controller may further include an access control module configured to read, from the off-chip memory and into the storage unit via the access interface, operational data required by the computation units to execute the computation subtasks, and store data generated by the computation units after executing the computation subtasks in the storage unit and/or the off-chip memory.

The access control module may include a Direct Memory Access (DMA) component that is responsible for data access and data transport.

In accordance with a second aspect of the embodiments, an on-chip heterogeneous AI processor is provided that includes a plurality of computation clusters connected through an on-chip data exchange network. Each computation cluster includes at least two different architectural types of computation units, wherein each computation unit is associated with a task queue configured to store computation subtasks to be executed by the computation unit. Each computation cluster further includes an access control module and a cache and an on-chip memory that are shared by the computation units. The on-chip heterogeneous AI processor further includes a controller configured to partition a received computation graph of a neural network into a plurality of computation subtasks and distribute the plurality of computation subtasks to respective task queues of the computation units in each computation cluster. The on-chip heterogeneous AI processor further includes an access interface configured to access an off-chip memory and a host interface configured to interact with an off-chip host processor.

In some embodiments, one of the at least two different architectural types computation units is a customized computation unit for a particular AI algorithm or operation, and the other is a programmable computation unit.

In some embodiments, the at least two different architectural types computation units include computation units of an Application Specific Integrated Circuit (ASIC) architecture and computation units of a General-Purpose Graphics Processing Unit (GPGPU) architecture.

The technical solutions adopted by the embodiments have the following beneficial effects.

Different application tasks are processed by managing and scheduling different architectural types of computation units in an on-chip heterogeneous manner, so that the AI processor can flexibly adapt to different application scenarios, thus improving both the scalability and the efficiency of processing different tasks. Such on-chip heterogeneous processor can support not only common computation applications, but also a large number of parallel computation applications and AI applications using deep neural network learning as core.

It should be understood that the foregoing general description and the following detailed description are merely exemplary and explanatory, and are not intended to limit the present invention.

BRIEF DESCRIPTION OF THE DRAWINGS

The accompanying drawings to be described herein are incorporated into this specification and constitute a part of this specification. These accompanying drawings illustrate the embodiments described herein, and are used together with this specification to explain the principle of the embodiments. Apparently, the accompanying drawings to be described hereinafter relate to only some of the embodiments, and other drawings can be obtained according to these accompanying drawings by a person of ordinary skill in the art without undue burdens. In the accompanying drawings.

DETAILED DESCRIPTION

Figure 1:
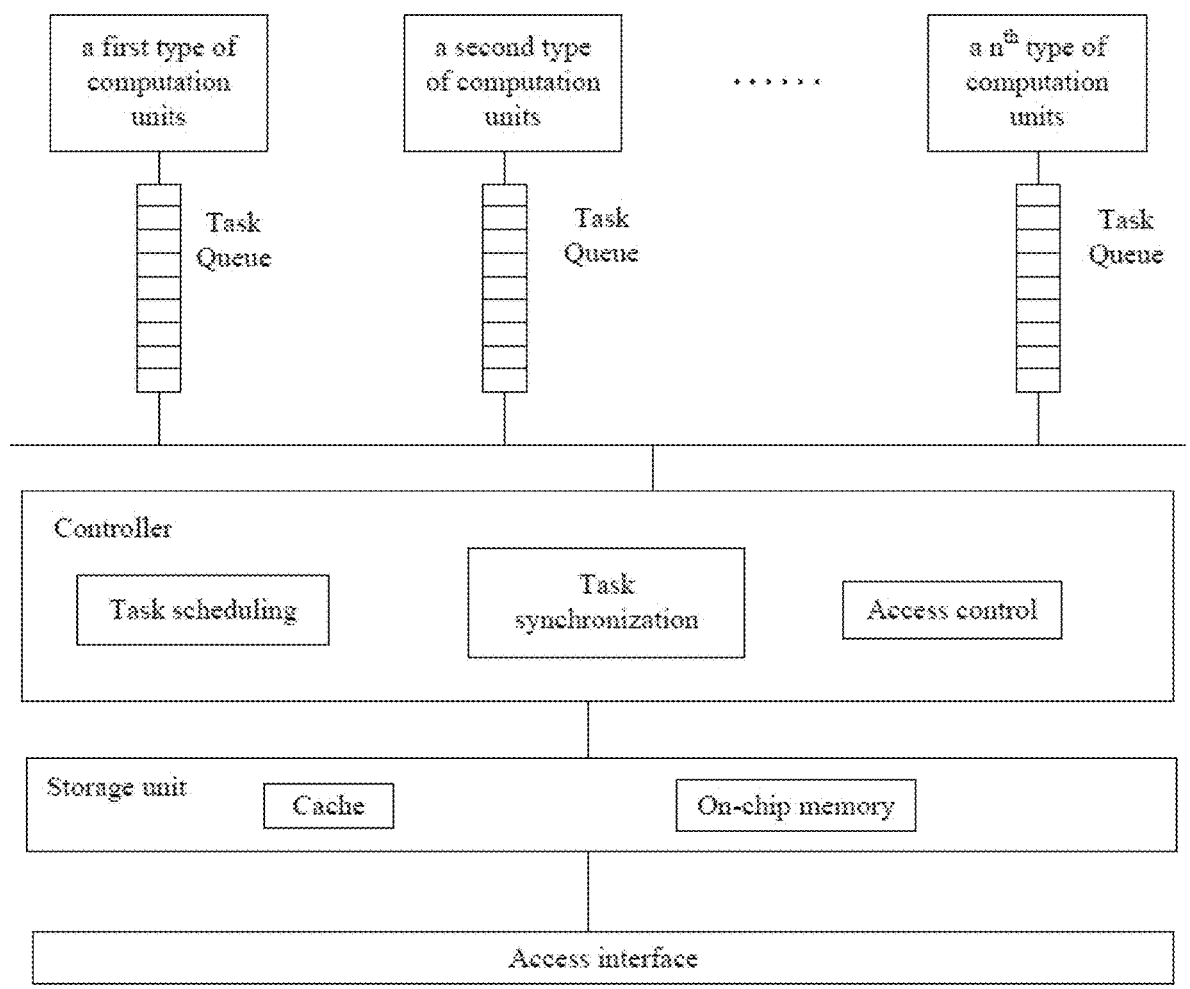
FIG. 1 shows a schematic structural diagram of an example on-chip heterogeneous AI processor according to one or more embodiments described herein.

To make the objectives, technical solutions and advantages of this disclosure more clear, the disclosure will be further described below in detail by specific embodiments with reference to the accompanying drawings. It should be understood that the embodiments described herein are some but not all of the embodiments contemplated. All other embodiments obtained by a person of ordinary skill in the art based on the embodiments of the present invention without undue burdens shall fall within the protection scope of this disclosure.

Additionally, the features, structures or characteristics described herein can be combined in one or more embodiments in any suitable manner. In the following description, numerous specific details are provided to fully understand the embodiments. However, those skilled in the art will recognize that, the technical solutions disclosed herein can be practiced without one or more specific details, or that other methods, components, devices, steps or the like can be employed. In other cases, well-known methods, devices, implementations or operations will not be shown or described in detail to avoid obscuring various aspects of the disclosure.

The block diagrams shown in the accompanying drawings are merely functional entities, and do not unnecessarily correspond to physically independent entities. In other words, these functional entities may be implemented in a software form, or implemented in one or more hardware modules or integrated circuits, or implemented in different networks, processing devices and/or microcontrollers.

The flowcharts shown in the accompanying drawings are merely illustrative. An implementation may not necessarily include all the contents and operations/steps shown in the flowcharts, and the operations/steps may not necessarily be executed in the order described. For example, some operations/steps may be divided while others may be combined or partially combined, so the actual order of execution may change according to the actual situation.

When referred to herein, heterogeneous computation may correspond to a way of computation using a system comprising computation units that utilize one or more types of instruction sets and/or architectures. The system may include a host processor (e.g., CPU) and/or other types of co-processors, such as GPUs, DSPs, ASICs, FPGAs, etc. Such a heterogeneous system may be implemented in the form of a System On Chip (SoC). Although different tasks can be performed by the system utilizing different types of computation units to improve the overall utilization of computation resources, the overhead associated with scheduling and/or data exchange may be relatively high, and the operating efficiency of the whole system may suffer.

This is because, architecturally, a SoC may integrate IP functional modules such as a processor module (including CPU and/or GPU), a memory module, various interface control modules as well as various interconnected buses, on a single chip, but the IP modules may be independent from each other and each may include a complete hardware system and embedded software thereon. This means that each of the IP modules on the SoC chip may be driven by a respective software, which may result in a relatively large scale of the SoC software and hardware. Moreover, standard protocol software for interconnection between IP functional modules from various IP suppliers may be provided or equipped on the SoC, so the overhead for scheduling and data exchange may be relatively high. Furthermore, with increasing types and complexity of the IF functional modules and the lack of universal interfaces, it may become more difficult to integrate the IPs. Coherence of data in this mode may also become an issue because the IP functional modules may be required to reserve their own copies of data to realize parallel or asynchronous computation, and the IP functional modules may often need to share data. For example, one IP functional module may depend on the data generated by another IP functional module. As such, a complex shared cache mechanism or a synchronization mechanism may be involved to ensure correct data exchange, and the performance of the system may suffer since the IP functional modules may need to wait for each other.

Additionally, an AI chip serving as a co-processor in the above-mentioned system is in itself homogeneous in nature. As mentioned in the background, the three mainstream AI chip architectures (GPU, FPGA and ASIC) have their own advantages and disadvantages. A GPU may have good parallel computation capability, but it is often designed for image processing and not for AI algorithms. Therefore, it may be difficult to use a GPU to satisfy AI algorithm requirements in different application scenarios. A FPGA may be hardware-programmable by languages such as OpenCL, so its flexibility of application may be improved, and it may be suitable for analyzing multiple instructions and a single data stream. However, such a FPGA may have low capability for large-scale parallel computation such as model training. An ASIC may be customized for particular AI application requirements. It is smaller in size and lower in power consumption, but it is not programmable and thus has poor adaptability and scalability. With the continuous popularization of AI algorithm clouds and a variety of intelligent terminal devices, there is an urgent need for an AI processor that can adapt to specific application requirements and is scalable, versatile and efficient.

In some embodiments, an AI processor in an on-chip heterogeneous form is provided that includes at least two architectural types of computation units. For example, one architecture may be a General-Purpose Graphics Processing Unit (GPGPU) that is programmable and capable of performing various common computation tasks, and the other architecture may be an Application Specific Integrated Circuit (ASIC) customized for particular AI algorithms. Since AI algorithms may involve a large number of matrices and derivative operations, a first ASIC may be configured to perform the multiplication, addition and division of matrices and a second ASIC may be configured to carry out vector operations and/or derivation operations. In some embodiments, ASICs may be configured for various types of neural networks including, for example, an ASIC configured for a CNN, an ASIC configured for a DNN and an ASIC configured for a RNN. In some embodiments, ASICs may be configured for various types of machine learning algorithms including, for example, an ASIC configured to support vector machine algorithms, an ASIC configured for K-mean algorithms, etc. Using these computation units configured for various AI algorithms and/or AI operations, the power consumption of the AI processor can be reduced and the chip area can be reduced. Computation tasks that cannot be processed by the aforementioned ASIC computation units may be allocated to and executed by other computation units such as computation units using a programmable GPGPU architecture. This way, the execution efficiency of different computation tasks in AI applications can be improved, the requirements of different application scenarios can be satisfied, and better scalability can be achieved. In still some embodiments, in addition to the two architectures described above, an on-chip heterogeneous AI processor may further include computation units in an FPGA form and/or computation units in a Digital Signal Processor (DSP) form. The AI processor may also use a general-purpose Central Processing Unit (CPU) as one of the computation units. In such an embodiment, various heterogeneous elements may be organically integrated on a chip and seamlessly scheduled by a single controller. Each of the computation units may realize its unique advantages without creating any obvious bottleneck, thus increasing the efficiency of AI computation.

An on-chip heterogeneous AI processor in accordance with the embodiments provided herein will now be described in more detail with reference to the accompanying drawings. For convenience of description, the following examples use a neural network as the basis of AI algorithms, and ASIC computation units and programmable GPGPUs as two types of computation units. The ASIC computation units (hereinafter "TUs") in the examples may be configured for matrix operations and the programmable GPGPU (hereinafter "CUs") may be configured for the remaining computation tasks. It should be noted, however, that these examples are not intended to constitute any limitation to the disclosure provided herein.

FIG. 1 shows an on-chip heterogeneous AI processor according to an embodiment provided herein. The on-chip heterogeneous AI processor includes at least two different architectural types of computation units. For example, a first type of computation units may be TUs and a second type of computation units may be CUs. Each of the computation units may have a corresponding task queue configured to store computation subtasks to be executed by the computation unit. The on-chip heterogeneous AI processor may further include a controller, a storage unit, and an access interface configured to access an off-chip memory such as a DDR. The controller may be configured to partition a received computation graph of a neural network into a plurality of computation subtasks and distribute the computation subtasks to corresponding task queues of the computation units. The storage unit may be configured to store data required by the computation units to execute the computation subtasks. In some embodiments, the storage unit may include a cache memory such as L1 cache and/or L2 cache, and an on-chip memory such as a Scratch-pad Memory (SPM). The computation units may share the on-chip memory and the cache memory.

In the AI processor shown in FIG. 1, the controller may be configured to allocate computation subtasks to the computation units, control the synchronization of the computation subtasks and be responsible for transporting and/or controlling data involved in the computation subtasks. The controller may include a task scheduling module, a task synchronization module and an access control module. The task scheduling module may be configured to analyze a received computation graph corresponding to a neural network program to be processed according to the characteristics of each current computation unit, partition the computation graph into a plurality of computation subtasks, and distribute each of the computation subtasks to corresponding task queue of the computation unit configured to process this type of computation subtasks. As mentioned above, the different architectural types of computation units may be configured to process different tasks or instructions. For example, a CPU may be configured to perform logic operations and branch-intensive control flows. A GPU may be configured to carry out high-throughput data processing and parallel computing. A computation unit having an ASIC architecture type and adapted for matrix operations and convolution calculation in deep learning may be configured to perform processing operations such as matrices and convolution calculations. A DSP may be configured to perform real-time signal processing, video encoding/decoding, etc. A computation unit having a GPGPU architecture may be configured to perform user-defined operations and other operations that cannot be executed by the TUs. Therefore, by allocating computation subtasks of the same type to the computation units suitable for processing those subtasks, execution efficiency can be improved and the overhead for internal handover can be avoided. In addition, the task scheduling module may also allocate the computation subtasks according to the processing capabilities of the computation units. For example, based on the current queuing status of the task queues of the computation units, the current load of the computation units, etc., the computation subtasks may be allocated evenly (e.g., as evenly as possible) among the computation units.

In some embodiments, the task scheduling module can also determine, according to the dependency among nodes in a computation graph, a dependency among the computation subtasks to be allocated to the computation units, and define synchronization event points in the task queues according to the determined dependency. The task synchronization module may realize automatic synchronization of the computation subtasks by monitoring the synchronization event points in the task queues. In some embodiments, the synchronization event points may comprise one or more synchronization control flags. Upon allocating the computation subtasks, the task scheduling module may determine whether there is a dependency between the current subtask and previous subtasks that have been allocated to the task queues. If there is a dependency, a synchronization control flag may be set for the current subtask, wherein the synchronization control flag may indicate or comprise parameters for the computation subtask on which the current subtask depends. These parameters may include, for example, a task queue identifier, a task number, etc. The task synchronization module may monitor the computation subtasks indicated by each of the synchronization control flags. When it is detected that a computation subtask has been executed, the task synchronization module can send an event notification to the relevant task queue and/or record the execution state of this computation subtask for subsequent inquiries. This way, when the current subtask with a synchronization control flag is extracted from a task queue for execution, an inquiry may be sent to the task synchronization module regarding whether the subtask(s) on which the current subtask depends has been executed. If the subtask(s) has not been executed, the current subtask may need to wait.

Taking the performance of operations in a neural network as an example, element-wise (EW) operations in the neural network may be suitable for CU computation units, while convolution calculation may be suitable for TU computation units. The computation graph of the neural network may include sequential computations of convolution+EW+convolution+EW. During task scheduling, the controller may allocate all convolution tasks to TUs and all EW tasks to CUs, as long as identifiers are provided on the task queues for events that may wait for each other for synchronization. This way, during a specific execution process, automatic synchronization of the task queues may be accomplished on hardware (e.g., without the intervention of controller software) so that the efficiency associated with parallel computing may be improved. Moreover, during the task scheduling, the controller can also control and optimize the cooperation mode among the computation subtasks. For example, the results of convolution by the TU computation units may be activated by the CUs, and the activation of the CU computation units may in turn depend on the completion of certain subtasks in the TUs, but it may not be necessary to wait for all of the tasks of a network layer to be completed in the TUs. Once the TU computation units have completed a portion of the subtasks, the CUs can begin executing tasks based on partial results from the TUs. This can be realized, for example, by setting appropriate synchronization event points in the task queues.

Figure 2A:
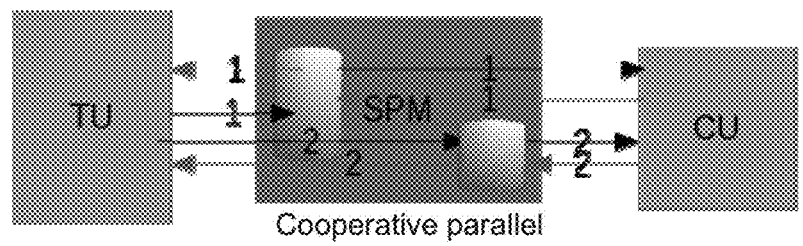
FIGS. 2A, 2B and 2C show respective schematic diagrams of example operation modes for different computation units according to one or more embodiments described herein.
Figure 2B:
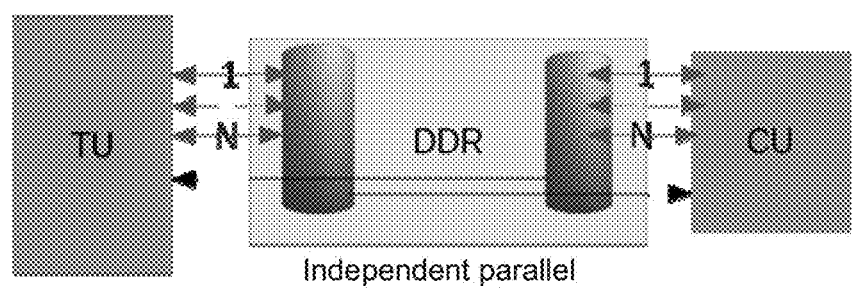
Figure 2C:
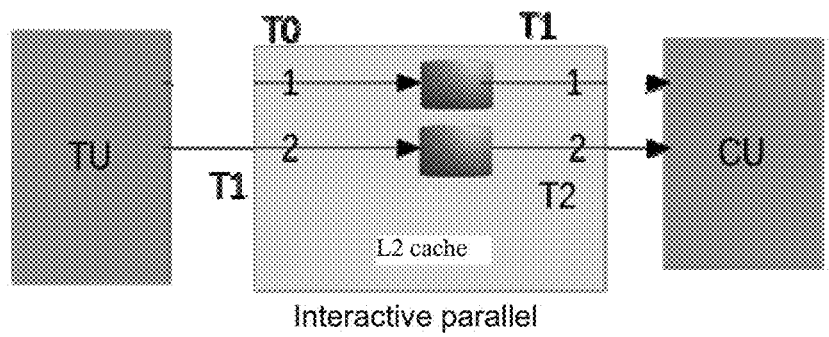

In some embodiments, there may be three operation modes for the computation units, e.g., an independent parallel mode, a cooperative parallel mode and an interactive cooperation mode. As shown in FIG. 2A, in the cooperative parallel mode, the computation subtasks of the computation units are executed cooperatively in a pipelined manner. The data dependence and synchronization of different computation subtasks are basically realized in the on-chip memory shared by the computation units. For example, a TU and a CU may cooperatively complete a task 1 (e.g., a batch process 1), but the TU can start its work first, store its generated results in the on-chip memory (e.g., SPM), and continue executing a task 2 (if the on-chip memory can store more results, the TU may proceed to execute more tasks subsequent to task 2). The CU extracts, from the on-chip memory, the results generated by the TU, and generates its own results for use by the TU. In this way, the TU and the CU will complete the task 1 and the task 2 in a slightly decoupled manner. For example, the result from the TU's execution of a first convolutional layer may be immediately used by the CU as an input of a next layer for an element-wise operation for which the CU is suitable, and the TU can continue working in the same layer but on another batch of data. As shown in FIG. 2B, in the independent parallel mode, different computation units can basically execute tasks independently and/or in parallel, and there is no urgent need for synchronization. The data dependence and synchronization of the computation subtasks of the computation units can be realized by off-chip memory (e.g., DDR), because there is a large storage space for storing the related data. For example, a TU and a CU can separately process a larger batch of data to fill nearly half of the DDR space, and then switch to the data generated for dependence previously and proceed to process the data. As shown in FIG. 2C, in the interactive cooperation mode, the computation units need to wait for each other during execution, for example, particularly when the TU lacks certain capabilities but the CU is used for compensation, or when the CU lacks processing capabilities but the TU is used. In this mode, the data dependence and synchronization are realized on a cache memory (e.g., L2 cache) with a limited size, so as to minimize the latency time and improve the throughput of the TU/CU. For example, the cache temporarily storing the results generated by the TU is read by the CU to execute a user-defined operation, and the result is also stored in the cache for further reading by the TU, so that the fusion operation is completed. The three modes can be combined for multiple times during the overall implementation of the neural network, and the operation mode for the computation subtasks of the computation units in the controller can be configured by software.

With continued reference to FIG. 1, the access control module in the controller is mainly responsible for transporting and controlling the data involved in the computation subtasks, and controlling the input and output of data operated by the computation units. For example, the access control module can prefetch, by a DMA component that executes independently from the computation units, the data involved in the computation subtasks from the off-chip memory to the on-chip memory and/or the cache memory through an access interface, so as to minimize the number of accesses and access latency. In some embodiments, the access control module can also be configured to determine, according to the operation mode for the computation units, the storage location and storage format of the intermediate results generated by the computation units, so as to enable the data to be used directly and smoothly, and to avoid or reduce additional data transport and reformatting. For example, in the independent parallel mode, the data generated by the computation units is set to be stored on the off-chip memory (DDR) with a larger space. In the cooperative parallel mode, the data generated by the computation units is set to be stored on the on-chip memory shared by the computation units to minimize the number of accesses. In the interactive cooperation mode, the data generated by the computation units is set to be stored on the internal cache, to minimize access latency. In some embodiments, the access control module can also configure and manage the on-chip memory, the cache memory, the off-chip memory or a region of the above memory that is shared by the computation units.

Figure 3A:
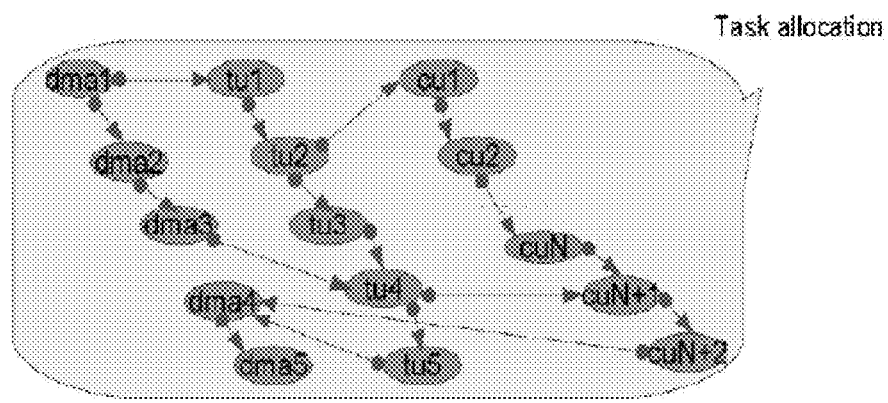
FIGS. 3A and 3B show respective schematic flowcharts of example task scheduling and task synchronization according to one or more embodiments described herein.
Figure 3B:
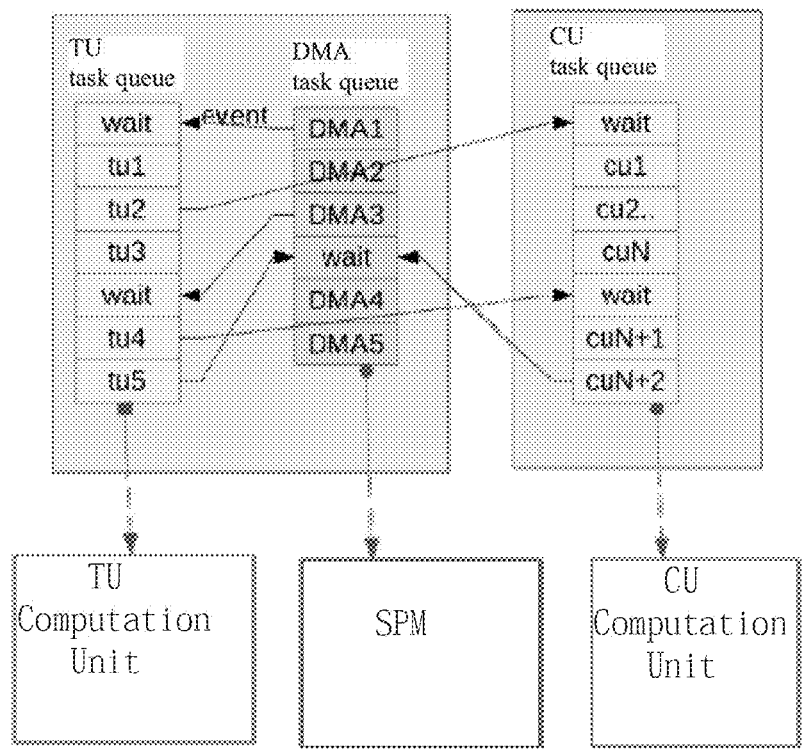

The task scheduling and synchronization process of the controller will be illustrated below with reference to FIGS. 3A and 3B, but the illustration is not intended to constitute any limitation thereto. The controller receives a computation graph of a neural network to be processed. The computation graph of the neural network may be predefined or converted by a software program, or may be obtained by commercial software such as TensorFlow®. In the computation graph of the neural network, each node corresponds to a computation subtask to be executed, and the edge between nodes indicates the input and output relationship between nodes and also reflects the dependency between nodes. As shown in FIG. 3A, the controller allocates, according to the characteristics and capabilities of each current computation unit, computation subtasks corresponding to the nodes in the received computation graph of the neural network to be processed to the corresponding task queues of different types of computation units (e.g., TUs and CUs) and processing units (e.g., a DMA component in the access control module that executes independently from the computation units). For example, the computation subtasks related to the access data, DMA1, DMA2, ..., DMA5, are stored in a DMA task queue, and the tasks in the DMA task queue are executed by the DMA component in the access control module of the controller for accessing the data involved in the computation subtasks of the computation units. The DMA component can execute independently from the computation units and be responsible for transporting and controlling data flows. The DMA component can prefetch the data required by the computation subtasks from the off-chip memory to the on-chip memory (e.g., SPM) to reduce access latency. Meanwhile, the computation subtasks tu1, tu2, ..., tu5, such as matrices, vectors and convolution, which may be suitable for execution by the TU computation units, are allocated to the task queue of the TU computation unit; and, the computation subtasks that are not supported by the TU computation unit and the user-defined computation subtasks cu1, cu2, ..., cuN, cuN+1, cuN+2 are allocated to the task queue of the CU computation unit. As shown in FIG. 3B, when the controller allocates subtasks to the task queues in a sequential processing order, the dependency among the subtasks also needs to be taken into consideration. When a certain subtask needs to depend on a subtask allocated to another task queue, a wait command can be inserted before this subtask, wherein the wait command can contain an identifier of the task queue to be waited for and an identifier of the subtask. During the execution of the wait command, the task synchronization module checks whether the computation subtask indicated by the wait command has been executed, and if the corresponding subtask has not been executed, additional waiting is still required. In still some embodiments, during the processing of the dependency, the controller controls the task queues to execute the respective tasks in parallel, and meanwhile allows the intermediate results to be exchanged between different task queues at some synchronization points. For example, a certain task in the task queue can be set to be event-dependent by a hardware-level event synchronization technology, so that the data generated by other types of computation units can be read from a certain region of the cache or the on-chip memory when a certain event notification is received.

During neural network processing, a neural network model is often abstracted to a directed acyclic data flow graph (i.e., a computation graph) comprising one or more operators, and kernel functions corresponding to these nodes are sequentially scheduled and executed in a certain topological order, thus completing the execution of the model. The operators corresponding to the nodes in the computation graph are usually defined at the granularity of algebraic operators such as addition, subtraction, multiplication and division of vectors, matrix multiplication or the like. Due to the low granularity of abstraction of the operators, a computation graph of a neural network training model will often include thousands of nodes, and the kernel functions need to be frequently called for multiple times. Thus, both the overhead for activation of kernel functions and the overhead for data transmission between kernel functions are relatively high. Therefore, in still some embodiments, the controller may also be configured to support an operator fusion mode in which kernel functions corresponding to some nodes in the computation graph are fused into one function, so that it can be completed only by one function call, thereby reducing the overhead caused by kernel activation. The controller can be configured to perform operator fusion on the same type of computation subtasks allocated to a same computation unit to make the execution of the computation unit more continuous and smooth while minimizing and avoiding the overhead for internal handover. For example, if a TU computation unit supports convolution and pooling operations at the same time, the convolution and the pooling can be fused in the TU computation unit. If a TU computation unit does not support a pooling operation, the controller may instruct the small-scale convolution and pooling operations to be fused in the CU computation unit.

In still some embodiments, the controller may also be configured to support an inter-layer fusion mode of the neural network. At present, during processing of a neural network model, each neural network layer reads, from an off-chip memory, data output from an upper layer, and stores a result obtained after the processing of this layer in the off-chip memory to serve as the input of a next layer. When there is a larger batch of data, much delay will be caused by frequently accessing the off-chip memory. In one or more embodiments described herein, the controller may be configured to support the inter-layer fusion mode, and the intermediate results output by the network layers for several successive times can be stored in the on-chip memory (e.g., SPM) to reduce the number of access to the off-chip memory.

Figure 4:
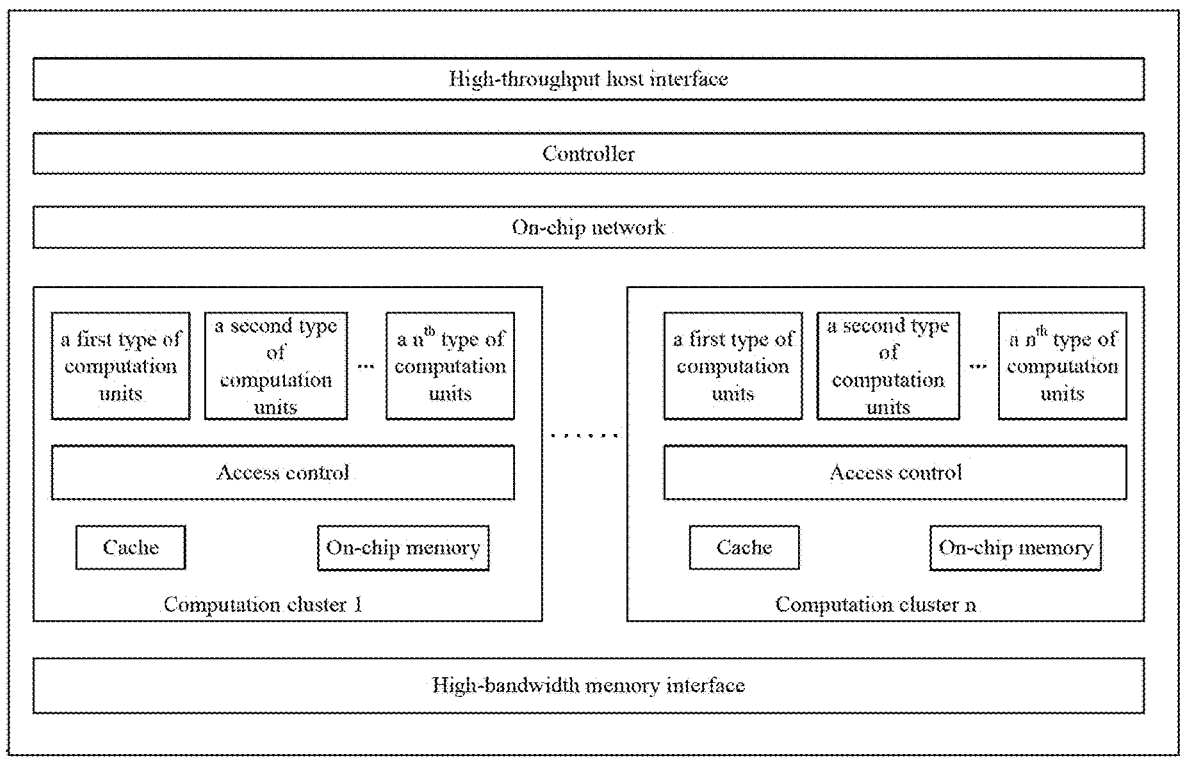
FIG. 4 shows a schematic structural diagram of an example on-chip heterogeneous AI processor according to one or more embodiments described herein.

Referring now to FIG. 4, a schematic structural diagram of an on-chip heterogeneous AI processor according to another embodiment is shown. The on-chip heterogeneous AI processor includes a plurality of computation clusters which are connected through an on-chip data exchange network, wherein each of the computation clusters includes at least two different architectural types of computation units (e.g., a first type of computation units such as TUs, and a second type of computation units such as CUs), an access control module and an on-chip memory shared by the computation units. The task queue corresponding to each the computation units is configured to store computation subtasks to be executed by the computation unit. The AI processor further includes a controller. Upon receiving a computation graph corresponding to a neural network program to be processed, the controller performs functional analysis on the computation graph according to the current load conditions of the computation clusters and the characteristics of different computation units included in the computation clusters, partitions the computation graph into a plurality of computation subtasks, and distributes the computation subtasks to the corresponding task queues of the computation units that can process this type of computation subtasks. The controller is also configured to control the synchronization of the computation subtasks. The AI processor further includes an access interface configured to access an off-chip memory and a host interface configured to interact with an off-chip host processor.

The three operation modes mentioned above may be utilized between the computation clusters and the computation units in each computation cluster. As described herein, these operation modes may include an independent parallel mode, a cooperative parallel mode and an interactive cooperation mode. The three modes can be combined for multiple times during the overall implementation of the neural network, and the operation mode for the computation subtasks of the computation units in the controller and for the computation clusters can be configured by software. The computation clusters exchange data through the on-chip data exchange network, and a global on-chip memory shared by the computation clusters may be set according to actual requirements.

In some embodiments, in the heterogeneous AI processor provided by the forgoing embodiments, the controller can be configured by configuration files, configuration options or software programs. For example, the task scheduling module can partition, according to configuration options indicating task allocation, the computation graph of the neural network to be processed into a plurality of computation subtasks and distribute the computation subtasks to task queues of the corresponding hardware of the computation units. The configuration options indicating task allocation may include task allocation based on type matching (e.g., the computation units for processing computation subtasks are selected according to the type of the computation subtasks), task allocation based on load (e.g., task allocation is performed according to the queuing status of the task queues of the computation units), task allocation based on a specified flag (e.g., computation subtasks with a specified flag are distributed to particular computation units indicated by this flag), etc. One or more configuration options can be set at the same time, and different configuration options have different priorities. For example, the task allocation based on type matching has the highest priority, the task allocation based on a specified flag has the second highest priority, and the task allocation based on load has the lowest priority. As another example, the task scheduling module can also set an operation mode (e.g., the independent parallel mode, the cooperative parallel mode or the interactive cooperation mode described herein) for the computation units according to a configuration option indicating the operation mode. In still some embodiments, the task scheduling module can also perform, according to a configuration option indicating operator fusion, operator fusion on the computation subtasks allocated to a same computation unit, and can notify, according to a configuration option indicating inter-layer fusion, the access control module to store the outputs from the intermediate neural network layers in a scratch-pad memory. In still some embodiments, nodes in the computation graph of the neural network to be processed may be set in advance by using configuration files, software programs or the like, or the nodes may be marked as being suitable to be processed by a certain architectural type of computation units. In this way, upon receiving the computation graph, the task scheduling module can distribute, according to the configuration options indicating task allocation, the computation subtasks to the corresponding task queues of the computation units. Additionally, the dependency among the computation subtasks may be configured, set, or adjusted by configuration files, software programs, etc. In this way, the task scheduling module can set, according to the corresponding configuration option indicating the dependency among the computation subtasks, a dependency of computation subtasks among the task queues. In some embodiments, the task scheduling module can also be configured to set, according to the received configuration option indicating the operation mode, an operation mode for the computation units. In some embodiments, the task scheduling module can also be configured to perform, according to the received configuration option indicating operator fusion, operation fusion on the computation subtasks allocated to a same computation unit. In some embodiments, the task scheduling module can also be configured to notify, according to the received configuration option indicating inter-layer fusion, the access control module to store the outputs from the intermediate neural network layers in a scratch-pad memory. In the above embodiments, the allocation of the computation subtasks to different computation units, the synchronization of the task queues, the data dependence and synchronization of the computation subtasks and the like can be flexibly adjusted by various different configuration options, so that the operation mode for each computation unit can be flexibly set for various application scenarios, and the hardware performance and computation efficiency of the heterogeneous processor itself can be fully utilized and exerted.

In this specification, references to "various embodiments", "some embodiments", "an embodiment", "embodiments" or the like mean that particular features, structures or properties described in conjunction with the embodiment are included in at least one embodiment. Therefore, the phrase "in various embodiments", "in some embodiments", "in an embodiment", "in embodiments" or the like appears in various locations throughout this specification and may not necessarily refer to a same embodiment. Additionally, particular features, structures or properties can be combined in one or more embodiments in any proper way. Therefore, particular features, structures or properties shown or described in conjunction with an embodiment can be completely or partially combined with the features, structures or properties in one or more other embodiments without limitation, as long as the combination is not illogical or inoperative.

The expressions of the terms such as "include/including", "have/having" and the like in this specification are intended to cover non-exclusive inclusion. For example, a process, method, system, product or device including a series of steps or units is not limited to the listed steps or units, and may optionally include steps or units that are not listed or optionally include other steps or units intrinsic to this process, method, product or device. The term such as "a/an" or "one" also does not exclude a plural situation. Additionally, the elements in the accompanying drawings of the present application are merely for illustrative purpose and are not drawn to scale.

Although the present invention has been described by the above embodiments, the present invention is limited to the embodiments described herein. Various alterations and variations made without departing from the scope of the present invention shall be included.

The invention claimed is:

1. An on-chip heterogeneous Artificial Intelligence (AI) processor, comprising:
   at least two different architectural types of computation units, each of the computation units being associated with a task queue configured to store computation subtasks to be executed by the computation unit, wherein a first one of the computation units is a customized computation unit for a particular AI algorithm or operation, and a second one of the computation units is a programmable computation unit;
   a controller configured to partition a received computation graph associated with a neural network into a plurality of computation subtasks and distribute the plurality of computation subtasks to the respective task queues associated with the computation units, wherein the controller distributes each computation subtask according to a type of the computation subtask to the task queue associated with a computation unit suitable for processing the type of the computation subtask;
   a storage unit configured to store data associated with executing the plurality of computation subtasks; and
   an access interface configured to access an off-chip memory;
   wherein the computation units are configured to support the following three operation modes: an independent parallel mode, a cooperative parallel mode, and an interactive cooperation mode, and wherein:
   in the independent parallel mode, at least two of the plurality of computation subtasks are executed independently and in parallel with each other, and data dependence and synchronization associated with different computation subtasks are realized in an off-chip memory shared by the computation units;
   in the cooperative parallel mode, at least two of the plurality of computation subtasks are executed cooperatively in a pipelined manner, and data dependence and synchronization associated with different computation subtasks are realized in an on-chip memory shared by the computation units; and
   in the interactive cooperation mode, a first one of the computation units, during the execution of a computation subtask distributed to the first one of the computation units, waits for or depends on results generated by a second one of the computation units executing a computation subtask distributed to the second one of the computation units, and data dependence and synchronization associated with different computation subtasks are realized in a cache memory shared by the computation units.

2. The on-chip heterogeneous AI processor according to claim 1, wherein the architectural types include at least one of Application Specific Integrated Circuit (ASIC), General-Purpose Graphics Processing Unit (GPGPU), Field-Programmable Gate Array (FPGA), or Digital Signal Processor (DSP).

3. The on-chip heterogeneous AI processor according to claim 1, wherein the computation units comprise a computation unit of an Application Specific Integrated Circuit (ASIC) architecture and a computation unit of a General-Purpose Graphics Processing Unit (GPGPU) architecture.

4. The on-chip heterogeneous AI processor according to claim 1, wherein the storage unit comprises a cache memory and a scratch-pad memory.

5. The on-chip heterogeneous AI processor according to claim 1, wherein the scratch-pad memory is shared by the computation units.

6. The on-chip heterogeneous AI processor according to claim 1, wherein the controller distributes the plurality of computation subtasks to the computation units according to the capabilities of the computation units.

7. The on-chip heterogeneous AI processor according to claim 1, wherein the controller further comprises an access control module configured to read, from the off-chip memory and into the storage unit via the access interface, operational data required by at least one of the computation units to execute one or more computation subtasks distributed to the at least one of the computation units, the access control module further configured to store data generated by the at least one of the computation units after executing the one or more computation subtasks in the storage unit and/or the off-chip memory.

8. A on-chip heterogeneous Artificial Intelligence (AI) processor, comprising:
   a plurality of computation clusters connected through an on-chip data exchange network, each of the computation clusters comprising:
      at least two different architectural types of computation units, each of the computation units being associated with a task queue configured to store computation subtasks to be executed by the computation unit, wherein a first one of the computation units is a customized computation unit for a particular AI algorithm or operation, and a second one of the computation units is a programmable computation unit;
      an access control module, and
      a cache and an on-chip memory shared by the computation units;
   a controller configured to partition a received computation graph associated with a neural network into a plurality of computation subtasks and distribute the plurality of computation subtasks to respective task queues associated with the computation units in each computation cluster, wherein the controller distributes each computation subtask according to a type of the computation subtask to the task queue associated with a computation unit suitable for processing the type of the computation subtask;

an access interface configured to access an off-chip memory; and a host interface configured to interact with an off-chip host processor;

wherein the computation units are configured to support the following three operation modes: an independent parallel mode, a cooperative parallel mode, and an interactive cooperation mode, and wherein:

in the independent parallel mode, at least two of the plurality of computation subtasks are executed independently and in parallel with each other, and data dependence and synchronization associated with different computation subtasks are realized in an off-chip memory shared by the computation units;

in the cooperative parallel mode, at least two of the plurality of computation subtasks are executed cooperatively in a pipelined manner, and data dependence and synchronization associated with different computation subtasks are realized in an on-chip memory shared by the computation units; and in the interactive cooperation mode, a first one of the computation units, during the execution of a computation subtask distributed to the first one of the computation units, waits for or depends on results generated by a second one of the computation units executing a computation subtask distributed to the second one of the computation units, and data dependence and synchronization associated with different computation subtasks are realized in a cache memory shared by the computation units.

9. The on-chip heterogeneous AI processor according to claim 8, wherein a first one of the computation units is a customized computation unit for a particular AI algorithm or operation, and a second one of the computation units is a programmable computation unit.

10. The on-chip heterogeneous AI processor according to claim 9, wherein the computation units comprise a computation unit of an Application Specific Integrated Circuit (ASIC) architecture and a computation unit of a General-Purpose Graphics Processing Unit (GPGPU) architecture.

* * * * *